July 5, 1960     M. WITTER     2,943,866
PROTECTIVE DEVICE
Filed Jan. 7, 1958
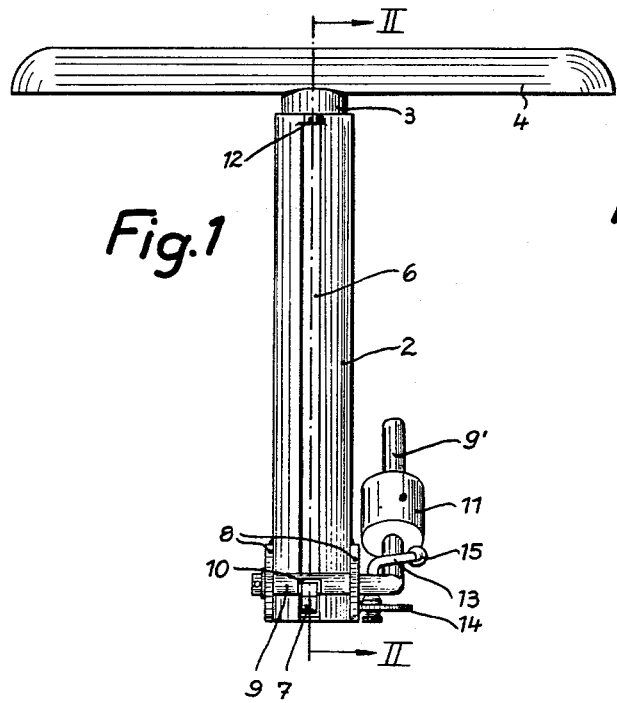
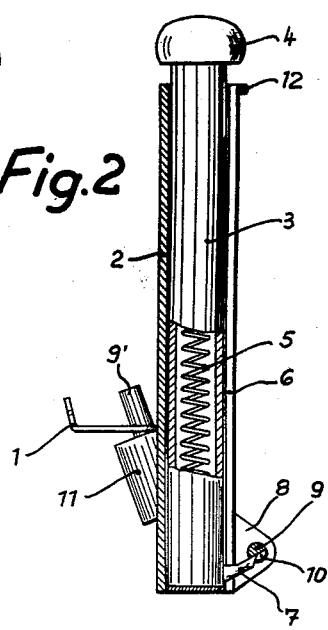
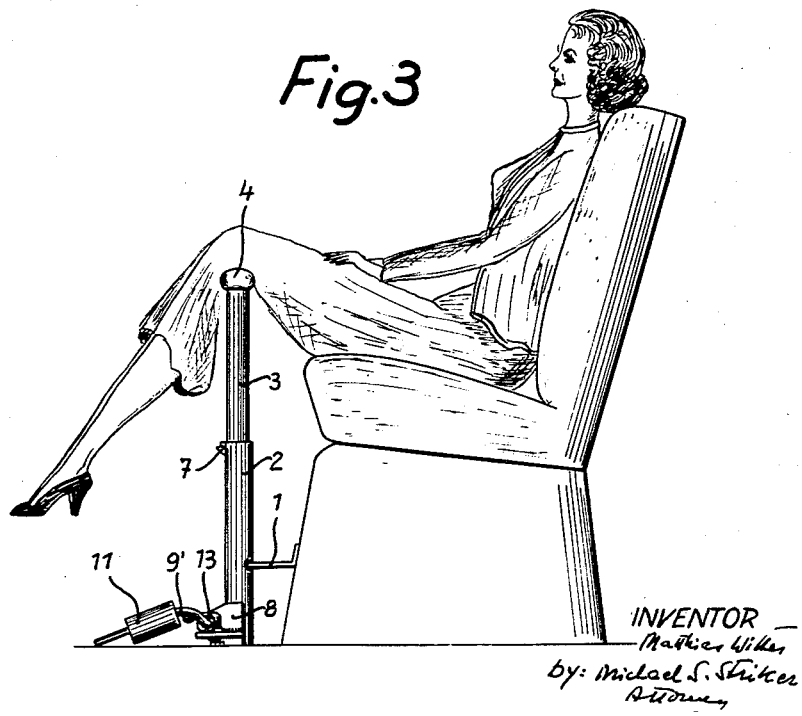
INVENTOR
Mathias Witter
by: Michael S. Striker
Attorney United States Patent Office 2,943,866
Patented July 5, 1960

2,943,866

PROTECTIVE DEVICE

Mathias Witter, Dorfstr. 11, Lerbeck-Porta, Westphalia, Germany

Filed Jan. 7, 1958, Ser. No. 707,491

Claims priority, application Germany Jan. 10, 1957

9 Claims. (Cl. 280—150)

The present invention relates to protective devices.

More particularly, the present invention relates to devices for use in vehicles to prevent injury to passengers thereof.

As is well known, when a vehicle such as an automobile is suddenly braked or is involved in a collision, it does not infrequently happen that a passenger seated next to the driver, for example, is suddenly thrown forwardly and becomes injured by striking up against the windshield, the window frame, the dashboard, or the like. Often times very serious injury and even death results.

One of the objects of the present invention is to provide a protective device which protects a passenger from being thrown forwardly upon sudden braking of the vehicle or when a collision occurs.

Another object of the present invention is to provide a protective device which is fully automatic and which will reliably operate automatically when there is a collision or a sudden reduction in speed to prevent the passenger from being thrown forwardly.

A further object of the present invention is to provide a device of the above type which takes up but a small space and does not cause any discomfort when the protective device is in a rest position ready for operation.

An additional object of the present invention is to provide with a protective device of the above type a manually operable member capable of being set to prevent the device from operating automatically.

It is also an object of the present invention to provide a structure capable of accomplishing all of the above objects and at the same time composed of simple, ruggedly constructed parts which are reliable in operation.

With the above objects in view the present invention includes in a protective device of the above type a support means which is adapted to be mounted on a vehicle in front of a passenger seat, and a raising means supported and guided by the support means for upward movement for raising the knees of a passenger to prevent the passenger from moving forwardly when the speed of the vehicle is sharply reduced. An urging means, such as a spring or the like, cooperates with the raising means to urge the latter upwardly from a rest position, and the structure of the invention includes an automatically releasable lock means which cooperates with the raising means for maintaining the latter against the force of the urging means in its lower rest position. The automatically releasable lock means responds to a sudden reduction in the speed of the vehicle for automatically releasing the raising means to the force of the urging means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view of a protective device according to the present invention as it appears when looking from the front toward the rear of the vehicle;

Fig. 2 is a sectional elevational view taken along line II—II of Fig. 1 in the direction of the arrows; and Fig. 3 illustrates the operation of the device.

Referring now to the drawings, the structure of the invention includes a support means in the form of a vertical guide tube 2 having a top open end and fixed by one or more straps 1 or the like to a seat of the vehicle directly in front of the seat, as indicated in Fig. 3. The straps may take the form of rigid metallic members welded to the tube 2 and bolted or otherwise fastened to the seat.

A raising means is supported and guided by the support means 2 for upward movement from a lower rest position indicated in Figs. 1 and 2, and this raising means is in the form of a T-shaped raising member made up of a horizontal leg 4 and a vertical leg 3 fixed to and extending downwardly from the leg 4 and being telescopically slidable within the tube 2.

An urging means urges the raising member upwardly from its lower rest position, and this urging means takes the form of a coil spring 5 located within the coaxial tube 2 and 3 and urging the later together with the horizontal leg 4 upwardly.

In accordance with the present invention the device includes an automatically releasable lock means which cooperates with a raising means 3, 4 to prevent the latter form moving upwardly under the influence of the spring 5, but this releasable lock means automatically responds during a sudden reduction in speed to unlock the raising means and release it to the spring 5. This locking means includes a projection 7 fixed to the inner tube 3 and extending from the tube 3 forwardly through a longitudinal vertical slot 6 formed in the tube 2. The locking means further includes a pair of ears 8 fixed to opposite sides of the outer tube 2 and extending forwardly therefrom in substantially parallel relation to each other. These ears 8 turnably support a horizontal shaft 9 in front of the tube 2, and the shaft 9 is formed with a notch 10, shown most clearly in Fig. 2, into which the projection 7 extends. It is apparent that when the parts have the position shown in Fig. 2 the notch shaft 9 cooperates with the projection 7 to prevent upward movement of the raising means 3, 4.

The releasable lock structure further includes a lever means for turning the shaft 9, and this lever means takes the form of an arm 9' integral with the shaft 9 and extending rearwardly from one end thereof, as shown in Figs. 1 and 2. The arm 9' which makes an angle of 90° with the shaft 9 carries a weight 11, and any suitable set screw or the like is threadedly carried by the weight 11 and may have its end pressed tightly against part of the arm 9' to adjustably locate the weight at a preselected part of the arm 9'. The rearward turning of the arm 9' together with the weight 11 (in a counter-clockwise direction as viewed in Fig. 2) is limited either by engagement of the arm 9' or weight 11 with the seat or by the provision of any suitable stop member.

With the parts in the position of Fig. 2, when there is a collision or a sudden reduction in vehicle speed the weight 11 will be thrown forwardly to cause the arm 9' to turn to the position indicated in Fig. 3, and as a result the shaft 9 will turn in a clockwise direction, as viewed in Fig. 2, so that the lock means is automatically released in this way, and thus the raising means 3, 4 is released to the influence of the compressed spring 5 which automatically expands so as to move the raising means upwardly. The horizontal leg 4 thus engages beneath the knees of the passenger and raises the knees so as to prevent the passenger from being thrown forwardly, as is clearly illustrated in Fig. 3.

A rigid member 12 is carried by the tube 2 at the upper end of slot 6 and the path of movement of the projection 7 causes the latter to engage the member 12 during upward movement of the tube 3 so that the member 12 cooperates with projection 7 to limit the upward movement of the raising means.

The horizontal leg 4 is covered with a soft material such as, for example, soft rubber, foam rubber, or upholstery material, so that the legs of the passenger are not injured by the device during upward movement of the raising member 3, 4.

There are times when operation of the safety device is not desired. For example, when the automobile is being cleaned it is undesirable to have the raising means released to the spring 5 accidentally. In order to prevent such accidental release at a time when operation of the device is not desired, the tube 2 fixedly carries an ear 14 (Fig. 1) which turnably supports a manually turnable L-shaped bar 13 provided at its outer free end with a gripping knob 15. When the operator turns the bar 13 to the position indicated in Fig. 1, the bar 13 is located in the path of turning movement of the lever arm 9', and therefore this lever arm is prevented by the bar 13 from turning to release the projection 7. In the position shown in Fig. 1 the horizontal arm of the bar 13 is located directly next to the arm 9'. The bar 13 is turned by the operator so as to locate its upper horizontal leg next to the right ear 8 of Fig. 1, in order to free the arm 9' for turning movement, so that the safety device is now operable. Thus, the bar 13 forms a means turnable to and from the blocking position shown in Fig. 1 for blocking the operation of the device.

It will be understood that each of the elements described above, or two or more together, may also find a useful application in other types of safety device differing from the types described above.

While the invention has been illustrated and described as embodied in automobile safety device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A protective device comprising, in combination, support means adapted to be mounted on a vehicle in front of a passenger seat; raising means supported and guided by said supporting means for upward movement for raising the knees of a passenger to prevent the passenger from moving forwardly when the speed of the vehicle is sharply reduced; spring means cooperating with said raising means for permanently urging the latter upwardly from a rest position into a raised upper position; releasable lock means cooperating with said raising means for maintaining the latter against the force of said spring means in said rest position; and inertia-responsive releasing means automatically actuated by a sudden deceleration of the vehicle for releasing said releasable lock means upon such sudden deceleration, whereby in such event said raising means will be released for sudden upward movement from its rest into its raised upper position exclusively by said spring means substantially independently of the extent of said sudden deceleration.

2. A protective device comprising, in combination, support means adapted to be mounted on a vehicle in front of a passenger seat; a telescopic assembly supported by said support means and arranged for movement into a raised extended position adapted to raise the knees of a passenger to prevent the passenger from moving forwardly when the speed of the vehicle is sharply reduced; spring means cooperating with said telescopic assembly and urging the same into said raised extended position from a rest position; and inertia-responsive automatically releasable lock means cooperating with said telescopic assembly for maintaining the latter against the force of said spring means in said rest position, said inertia-responsive automatically releasable lock means responding to a sudden deceleration of the vehicle sufficient to cause the lock to release, due to inertia, said telescopic assembly to the force of said spring means.

3. A protective device comprising, in combination, a tube having a top open end and adapted to be supported in a vertical position on the floor of a vehicle just in front of a passenger seat thereof; a T-shaped raising member having an upper horizontal leg and a vertical leg extending downwardly from said horizontal leg and slidably telescoped within said tube; spring means in the latter urging said raising member upwardly so that the horizontal leg thereof will engage a passenger beneath the knees to raise the knees and thus prevent forward movement of the passenger when the vehicle speed is sharply reduced; and lock means having an inert mass, said lock means being mounted on said support means and movable between a first position in which said lock means cooperate with said raising member for maintaining the latter against the force of said spring means in a lower rest position, and a second position in which said lock means release said raising member to the force of said spring means, said lock means due to the inert mass thereof responding to a sudden reduction in the speed of the vehicle for moving from said first to said second position thereof.

4. A device as recited in claim 3 and wherein said tube is formed with a longitudinal slot, said lock means including a projection of said vertical leg extending through said slot to the exterior of said tube, a horizontal shaft turnably carried by said tube and formed with a notch in which said projection is located in engagement with said shaft to prevent upward movement of said raising member by said spring means, lever means fixed to said shaft for turning the same to release said projection from said notch so as to unlock said raising member, and a weight adjustably carried by said lever means.

5. A protective device comprising, in combination, support means adapted to be mounted on a vehicle in front of a passenger seat; raising means supported and guided by said supporting means for upward movement for raising the knees of a passenger to prevent the passenger from moving forwardly when the speed of the vehicle is sharply reduced; urging means cooperating with said raising means for urging the latter upwardly from a rest position; lock means having an inert mass, said lock means being mounted on said support means and movable between a first position in which said lock means cooperate with said raising means for maintaining the latter against the force of said urging means in said rest position, and a second position in which said lock means release said raising means to the force of said urging means, said lock means due to the inert mass thereof responding to a sudden reduction in the speed of the vehicle for moving from said first to said second position thereof; and manually operable means cooperating with said lock means for preventing release of the latter.

6. A protective device comprising, in combination, a tube having a top open end and adapted to be supported in a vertical position on the floor of a vehicle just in front of a passenger seat thereof; a T-shaped raising member having an upper horizontal leg and a vertical leg extending downwardly from said horizontal leg and slidably telescoped within said tube; spring means in the latter urging said raising member upwardly so that the horizontal leg thereof will engage a passenger beneath the knees to raise the knees and thus prevent forward movement of the passenger when the vehicle speed is sharply reduced; lock means having an inert mass, said lock means being mounted on said support means and movable between a first position in which said lock means cooperate with said raising member for maintaining the latter against the force of said spring means in a lower rest position, and a second position in which said lock means release said raising member to the force of said spring means, said lock means due to the inert mass thereof responding to a sudden reduction in the speed of the vehicle for moving from said first to said second position thereof; and manually operable means cooperating with said lock means for preventing release of the latter.

7. A device as recited in claim 3 and wherein said tube is formed with a longitudinal slot, said lock means including a projection of said vertical leg extending through said slot to the exterior of said tube, a horizontal shaft turnably carried by said tube and formed with a notch in which said projection is located in engagement with said shaft to prevent upward movement of said raising member by said spring means, lever means fixed to said shaft for turning the same to release said projection from said notch so as to unlock said raising member, and a weight adjustably carried by said lever means; and a bar turnably carried by said tube to be manually turned to and from a position blocking said lever means so that said lock means will not be released while said bar is in its blocking position.

8. A device as recited in claim 3 and wherein said horizontal leg of said raising member is provided with a covering of a soft material.

9. A protective device comprising, in combination, support means adapted to be mounted on a vehicle in front of a passenger seat; raising means supported and guided by said support means for upward movement for raising the knees of a passenger to prevent the passenger from moving forwardly when the speed of the vehicle is sharply reduced; urging means cooperating with said raising means for urging the latter upwardly from a rest position; and lock means having an inert mass, said lock means being mounted on said support means and movable between a first position in which said lock means cooperate with said raising means for maintaining the latter against the force of said urging means in said rest position, and a second position in which said lock means release said raising means to the force of said urging means, said lock means responding to a sudden reduction in the speed of the vehicle for moving from said first to said second position thereof.

References Cited in the file of this patent

UNITED STATES PATENTS

| | | |
|---|---|---|
| 2,473,947 | Hamstrom | June 21, 1949 |
| 2,796,112 | Barsky | June 18, 1957 |